M8046 OR RE 6,770

[redacted] [redacted]

J. W. JARBOE.

PAPER WAGON-BODY.

No. 6,770. Reissued Nov. 30, 1875.

*Fig: 1*

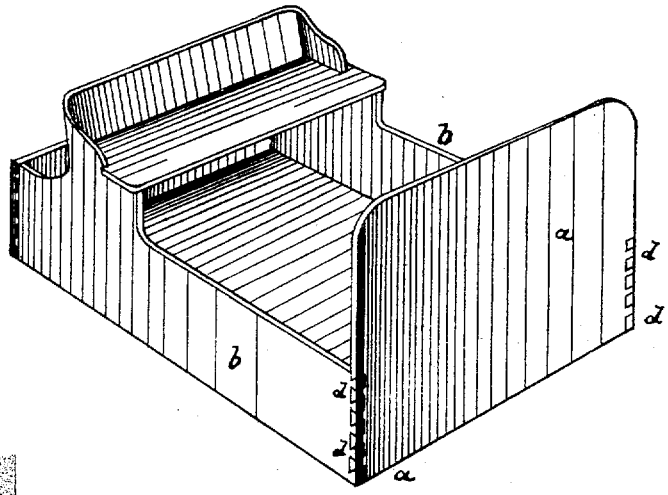

770.—Paper Wagon-Bodies. John W. Jarboe, Green Point, N. Y. Patent No. 98,611, dated July 13, 1869. [Filed June 13, 1874.]

A body for wagons and other vehicles, constructed of stiff paper, with the ends secured by the dovetail joints, as set forth and described.

*Fig: 2.*

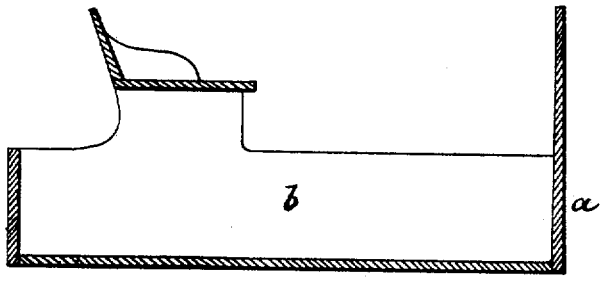

*Witnesses:*

Chas. Raetig.
Fr. Brüsen

*Inventor:*

J. W. Jarboe
by his attorney
A. v. Briesen

N. PETERS, PHOTO-LITHOGRAPHER, WASHINGTON, D. C.

UNITED STATES PATENT OFFICE.

JOHN W. JARBOE, OF GREEN POINT, NEW YORK.

IMPROVEMENT IN PAPER WAGON-BODIES.

Specification forming part of Letters Patent No. 92,611, dated July 13, 1869; reissue No. 6,770, dated November 30, 1875; application filed June 13, 1874.

DIVISION A.

*To all whom it may concern:*

Be it known that I, JOHN W. JARBOE, of Green Point, Kings county, State of New York, have invented an Improvement in Joints for Paper Bodies, of which the following is a specification:

In the drawing, Figure 1 represents a perspective view of a paper wagon-body having my improved joint. Fig. 2 is a longitudinal section of the same.

Similar letters of reference indicate corresponding parts in both figures.

This invention relates to an improvement in paper bodies—that is to say, in the mode of joining sections of stiff paper together to form certain bodies, such as wagon-bodies, &c.

The invention consists in furnishing the ends of the paper body to be joined with flaring tenons, known as "dovetails," so that by inserting the tenon on one end into a corresponding mortise of the other end, a durable and reliable connection can be formed without bending the tenons.

By the use of the unbent dovetail-joint, the inconveniences heretofore experienced in joining two pieces of stiff paper will be entirely overcome, as the unbent dovetail interlocking-joint furnishes a permanent and durable connection, and is at the same time a joint easy of production.

Paper bodies of stiff paper were, previous to my invention, usually joined by beveling the edges and gluing them together, so that the strength of the glue, and not the strength of the stiff paper, constituted the only reliance for the permanency of the connection.

In the patent of L. Carrier, No. 67,022, a dovetail-joint is shown on a paper box, but in such a manner that each tenon must be bent at its small end, parallel to the joined paper, which, of course, involves great labor, and does not allow the tenon to resist tension in the direction in which it is cut.

The wagon-body, which is represented in Fig. 1, shows a dash-board, *a*, to be joined to the sides *b* of the wagon-body by dovetails *d d*, which are cut into the contiguous edges in the manner customary to form dovetails on wooden bodies, and applied without bending to their respective mortises.

The same form of joint may be used on all the other parts of the wagon-body.

I do not claim to have invented a dovetail-joint, for I know that such a joint has been in use before, in wood especially; but I have experienced the difficulty of joining stiff paper so that the great strength of the material may be utilized at the joint; and

I claim as my invention—

A body for wagons and other vehicles, constructed of stiff paper, with the ends secured by the dovetail-joints, as set forth and described.

J. W. JARBOE.

Witnesses:

A. V. BRIESEN,

F. V. BRIESEN.